(12) United States Patent
Chen et al.

(10) Patent No.: US 9,262,221 B2
(45) Date of Patent: Feb. 16, 2016

(54) CALCULATING THE RANK OF MULTIPLE VIRTUAL MACHINES BASED ON A NEGATIVE CORRELATION BETWEEN THE RANK AND EACH OF THE COMPUTATIONAL CAPACITY AND MONETARY INVESTMENT

(71) Applicant: International Business Machines Corporation, Armonk, NY (US)

(72) Inventors: Yiyu L. Chen, Rueschlikon (CH); Antonius P. Engbersen, Rueschlikon (CH); Sebastiano Spicuglia, Lugano (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 34 days.

(21) Appl. No.: 14/041,399

(22) Filed: Sep. 30, 2013

(65) Prior Publication Data

US 2015/0095906 A1    Apr. 2, 2015

(51) Int. Cl.
G06F 9/455    (2006.01)
G06F 11/34    (2006.01)
G06F 9/50    (2006.01)

(52) U.S. Cl.
CPC .......... *G06F 9/5011* (2013.01); *G06F 9/45558* (2013.01); *G06F 11/34* (2013.01); *G06F 2009/45591* (2013.01)

(58) Field of Classification Search
None
See application file for complete search history.

(56) References Cited

U.S. PATENT DOCUMENTS

2006/0155633 A1* 7/2006 Fellenstein et al. ............. 705/37
2007/0028237 A1* 2/2007 Bulson et al. ..................... 718/1
2012/0137001 A1* 5/2012 Ferris et al. .................. 709/226

* cited by examiner

*Primary Examiner* — Abdullah Al Kawsar
*Assistant Examiner* — Jorge A Chu Joy-Davila
(74) *Attorney, Agent, or Firm* — Cantor Colburn LLP; Daniel Morris

(57) ABSTRACT

In some embodiments of this disclosure, a computer-implemented method includes accessing a set of two or more activity logs associated with two or more virtual machines, each activity log being associated with a corresponding virtual machine. A computational capacity is calculated, by a computer processor, for each of the virtual machines based at least in part on the activity logs. A rank is calculated for each of the virtual machines, where a first rank calculated for a first virtual machine is based, at least in part, on a monetary cost of the first virtual machine and the calculated computational capacity of the first virtual machine.

15 Claims, 4 Drawing Sheets

CALCULATING THE RANK OF MULTIPLE VIRTUAL MACHINES BASED ON A NEGATIVE CORRELATION BETWEEN THE RANK AND EACH OF THE COMPUTATIONAL CAPACITY AND MONETARY INVESTMENT

BACKGROUND

Various embodiments of this disclosure relate to virtual machines and, more particularly, to ranking virtual machines against one another.

When computing work needs to be performed, that work may be assigned to a virtual machine from among a group of available virtual machines. In making such assignments, some form of load balancing is used to determine which virtual machine is assigned new work, so that work is distributed in a reasonable way.

SUMMARY

In one embodiment of this disclosure, a computer-implemented method includes accessing a set of two or more activity logs associated with two or more virtual machines, each activity log being associated with a corresponding virtual machine. A computational capacity is calculated, by a computer processor, for each of the virtual machines based at least in part on the activity logs. A rank is calculated for each of the virtual machines, where a first rank calculated for a first virtual machine is based, at least in part, on a monetary cost of the first virtual machine and the calculated computational capacity of the first virtual machine.

In another embodiment, a system includes a load balancer and a ranker. The load balancer is configured to maintain a cloud of two or more activity logs associated with two or more virtual machines, each activity log being associated with a corresponding virtual machine. The ranker is configured to calculate a computational capacity of each of the virtual machines in the cloud based at least in part on the activity logs, and to calculate a rank for each of the virtual machines in the cloud. A first rank calculated for a first virtual machine is based, at least in part, on a monetary cost of the first virtual machine and the calculated computational capacity of the first virtual machine.

In yet another embodiment, a computer program product includes a computer readable storage medium having computer readable program code embodied thereon. The computer readable program code is executable by a processor to perform a method. The method includes accessing a set of two or more activity logs associated with two or more virtual machines, each activity log being associated with a corresponding virtual machine. Further according to the method, a computational capacity is calculated, by a computer processor, for each of the virtual machines based at least in part on the activity logs. A rank is calculated for each of the virtual machines, where a first rank calculated for a first virtual machine is based, at least in part, on a monetary cost of the first virtual machine and the calculated computational capacity of the first virtual machine.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Various embodiments of this disclosure are ranking systems and methods, configured to rank virtual machines based on their calculated values. These values represent the return on investment for the each virtual machine.

Figure 1:
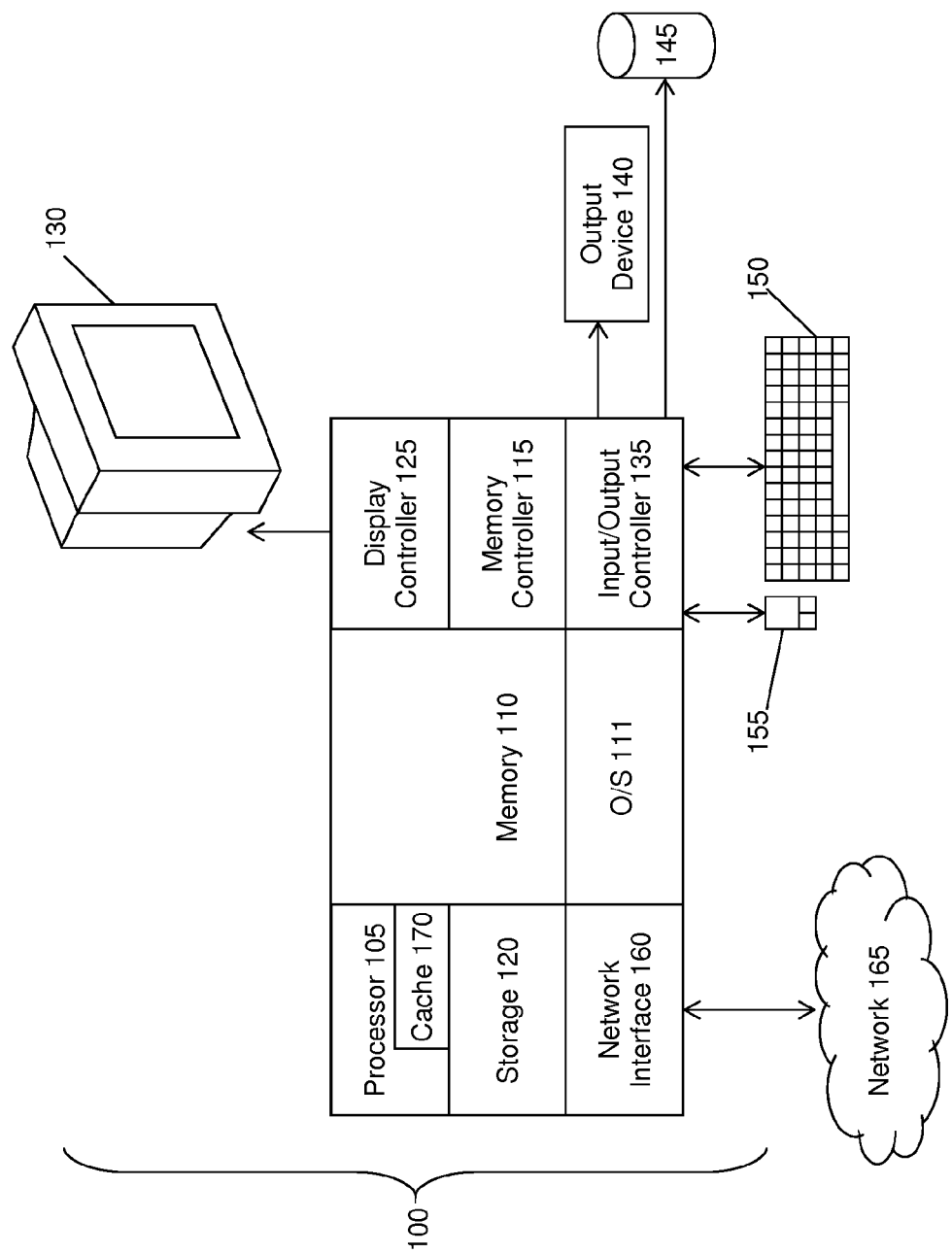
FIG. 1 is a block diagram of a computer system for use in implementing a ranking system or method, according to some embodiments of this disclosure.

FIG. 1 illustrates a block diagram of a computer system 100 for use in implementing a ranking system or method according to some embodiments. The ranking systems and methods described herein may be implemented in hardware, software (e.g., firmware), or a combination thereof. In an exemplary embodiment, the methods described may be implemented, at least in part, in hardware and may be part of the microprocessor of a special or general-purpose computer system 100, such as a personal computer, workstation, minicomputer, or mainframe computer.

In an exemplary embodiment, as shown in FIG. 1, the computer system 100 includes a processor 105, memory 110 coupled to a memory controller 115, and one or more input and/or output (I/O) devices 140 and 145, such as peripherals, that are communicatively coupled via a local I/O controller 135. The I/O controller 135 may be, for example (but not by way of limitation), one or more buses or other wired or wireless connections, as are known in the art. The I/O controller 135 may have additional elements, which are omitted for simplicity, such as controllers, buffers (caches), drivers, repeaters, and receivers, to enable communications.

The processor 105 is a hardware device for executing hardware instructions or software, particularly those stored in memory 110. The processor 105 may be any custom made or commercially available processor, a central processing unit (CPU), an auxiliary processor among several processors associated with the computer system 100, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include any one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive.

In an exemplary embodiment, a conventional keyboard 150 and mouse 155 may be coupled to the I/O controller 135. Other output devices such as the I/O devices 140 and 145 may include input devices, for example but not limited to, a printer, a scanner, a microphone, and the like. The I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

The computer system 100 may further include a display controller 125 coupled to a display 130. In an exemplary embodiment, the computer system 100 may further include a network interface 250 for coupling to a network 165. The network 165 may be an IP-based network for communication between the computer system 100 and any external server, client and the like via a broadband connection. The network 165 transmits and receives data between the computer system 100 and external systems. In an exemplary embodiment, the network 165 may be a managed IP network administered by a service provider. The network 165 may be implemented in a wireless fashion, e.g., using wireless protocols and technologies, such as WiFi, WiMax, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Ranking systems and methods according to this disclosure may be embodied, in whole or in part, in computer program products or in computer systems 100, such as that illustrated in FIG. 1.

Figure 2:
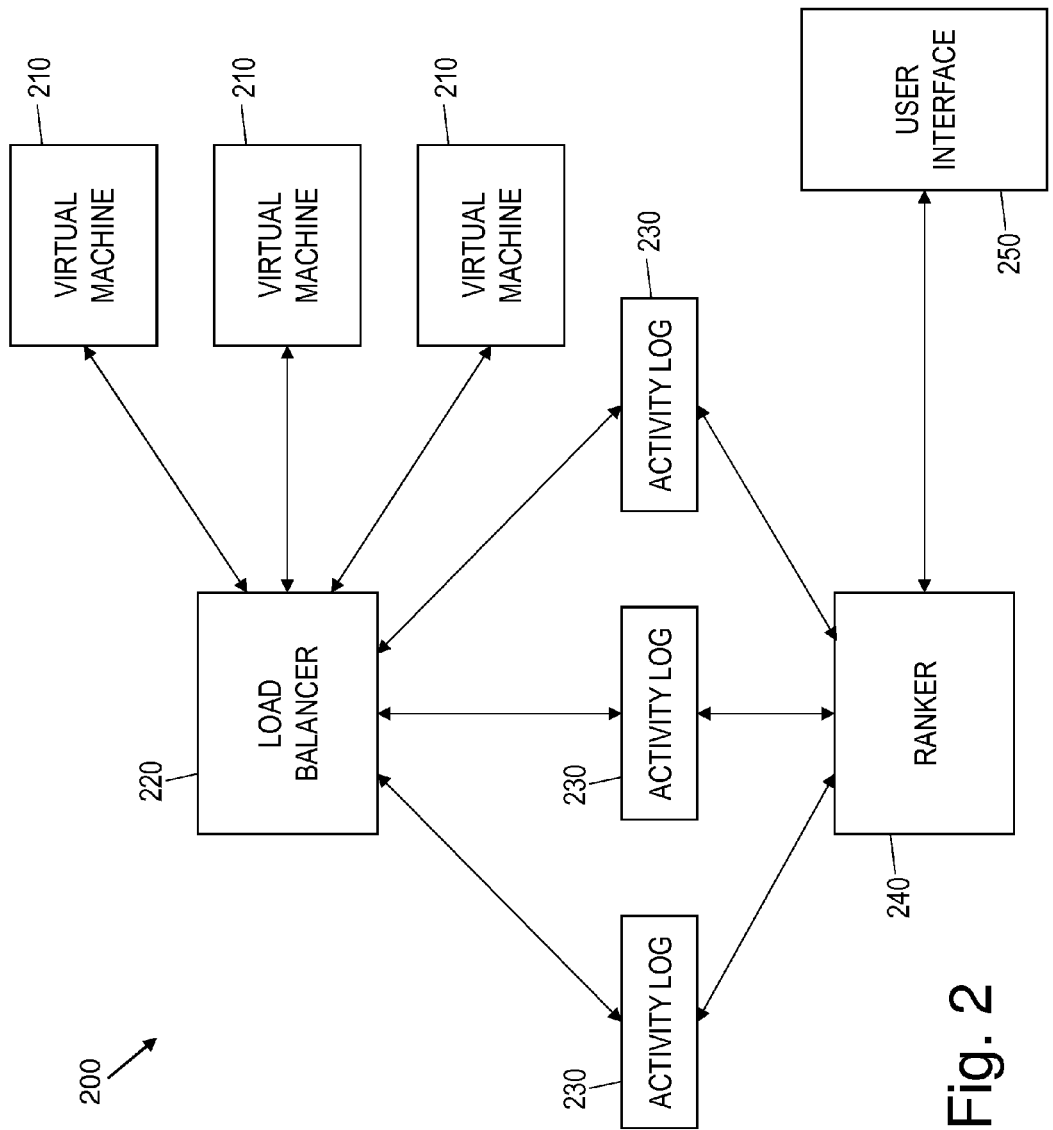
FIG. 2 is a block diagram of the ranking system, according to some embodiments of this disclosure.

FIG. 2 is a block diagram of a ranking system 200, according to some embodiments of this disclosure. As shown, the ranking system 200 may include a load balancer 220 configured to distribute work to a set of virtual machines 210. The ranking system 200 may also include a ranker 240 configured to analyze activity logs 230 of the virtual machines 210, so as to rank the virtual machines 210.

When work requests are received, the load balancer 220 may distribute the work to the virtual machines 210. The load balancer 220 may update activity logs 230 for each of the virtual machines 210 when work is assigned. For instance, when the load balancer 220 assigns work to a first virtual machine 210, the load balancer 220 may then update the activity log 230 of the first virtual machine 210 to indicate the new work assignment and the arrival time of the assignment, such as by providing a new entry into the activity log 230. The new entry may indicate a time at which the work was assigned to the virtual machine 210. When a virtual machine 210 completes a work assignment, it may notify the load balancer 220. The load balancer 220 may update that virtual machines 210 activity log 230 to indicate the completion time, or departure time, of that work assignment.

The ranker 240 may access the various activity logs 230 of the virtual machines 210. From the activity logs 230, the ranker 240 may maintain a set of variables describing each virtual machine 210. The set of variables associated with a first virtual machine may be based on the data stored in the activity log 230 of the first virtual machine 210. Thus, the set of variables may be based, at least in part, on entries made in the activity logs 230 by the load balancer 220. In some embodiments, the ranker 240 may be integrated into the load balancer 210, which may in that case both maintain and analyze the activity logs 230 as needed.

For each virtual machine 210, the set of variables maintained by the ranker 240 may include, for example: quantity of outstanding work assignments (represented by N throughout this disclosure); time at which the most recently completed work assignment was completed (L); computational capacity (C); and monetary cost per hour (M) of using the virtual machine 210. As will be discussed further below, the current value of computational capacity may be calculated based on the prior value of the computational capacity, as well as based on other variables related to the virtual machine 210. The cost per hour may be calculated based on the current computational capacity and the cost of using the virtual machine 210.

In some embodiments, the set of variables may also include a Boolean value (V) representing validity of the completion time L of the most recently completed work assignment. If the value V indicates invalidity, then it may be assumed that this completion time is not valid. This may be the case, for example, if no work has yet been completed by the virtual machine 210 in question, and thus no last completion time exists.

In some embodiments, the computational capacity may indicate how full the respective virtual machine 210 is. In other words, it may represent how much of the virtual machine's capacity is currently in use. When calculated, the computational capacity may be a weighted average of the prior computational capacity and the time elapsed since a work assignment was last completed. The computational capacity C at time T may be based on the computational capacity calculated for a previous time P, and may be as follows: $C_T = 0.9 \cdot C_P + 0.1(T-L)$. It will be understood that the values 0.9 and 0.1 in this formula are provided for illustrative purposes only, and that other weights may be used instead.

In an exemplary embodiment, when work has been completed recently, T-L will be small, and thus $C_T$ may be reduced as compared to the prior computational capacity $C_P$. In contrast, if the virtual machine is completing work slowly, and has not completed work for a relatively long time, T-L will be large, and $C_T$ may increase as compared to $C_P$. In some embodiments, the ranker 240 may update the current value of the computational capacity C when each work assignment is completed, thus equating T−L to the time between the last two completed work assignments. In some other embodiments, the computational capacity may be updated when a predetermined quantity of work assignments have been completed since the previous update of the computational capacity variable.

Figure 3:
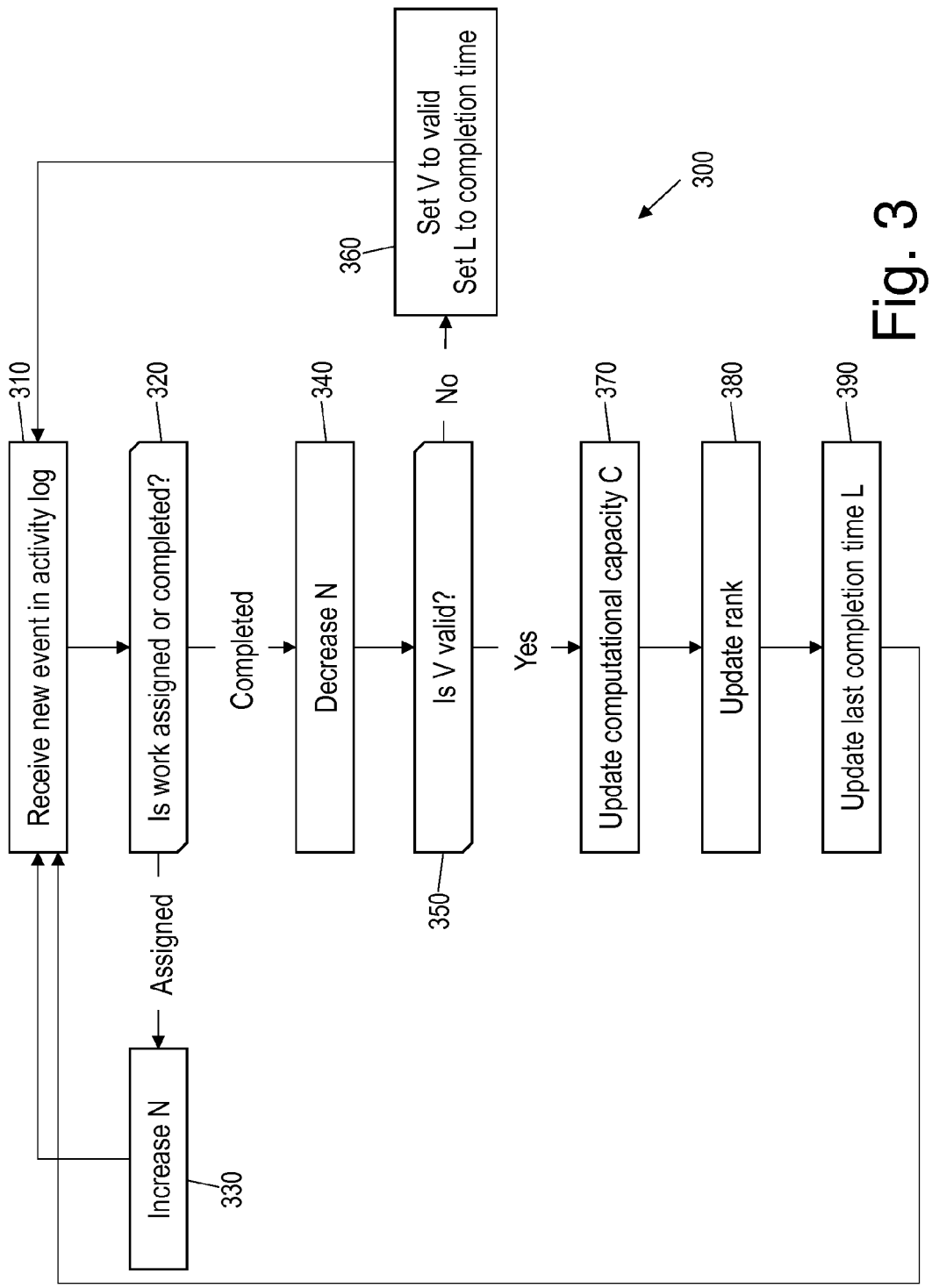
FIG. 3 is a flow diagram of a method for ranking a virtual machine, according to some embodiments of this disclosure.

FIG. 3 is a flow diagram of a method 300 for updating the variables related to a virtual machine 210, according to some embodiments of this disclosure. As shown, at block 310, a new event is received in the activity log 230 of the virtual machine 210. At decision block 320, it is determined whether the new event is an indication of work having been assigned or having been completed. At block 330, if work was assigned in the new event, then the value of N, i.e., the quantity of outstanding assignments, may be increased. The method 300 may then return to block 310 to receive additional event notifications. At block 340, if the event was the completion of work, then the value of N may be decreased. At decision block 350, it may be determined whether V is valid, i.e., whether the time of last completion is valid. If not, then at block 360, V may be set to valid and L may be set to the time of the new work completion event. The method 300 may then return to block 310 to receive additional event notifications. If V is already valid, then at block 370, the computational capacity C may be updated. At block 380, a rank of the virtual machine 210 for which the work completion event was received may be updated as well. The calculation if such rank will be described in more detail below. At block 390, the last completion time L may be updated to the time of the completion event, and the validity V of that last completion time may be set to true. The method 300 may then return to block 310 to receive additional event notifications.

Using the variables determined from the activity logs 230, the ranker 240 may calculate a rank for each of the virtual machines 210. A virtual machine's rank may indicate its computing capacity versus its cost. An increase in computing capacity may decrease a virtual machine's rank, while a decrease in computing capacity may increase the rank. Likewise, an increase in cost of a virtual machine 210 may decrease the rank, while a decrease in cost may increase the rank. Thus, there may exist a negative correlation between rank and computing capacity, as well as a negative correlation between rank and cost.

Where the variable K represents the quantity of virtual machines 210 being ranked relative to one another, and where $R_i$ represents the rank of the $i^{th}$ virtual machine 210, the ranker 240 may use the following formula to calculate the rank of a virtual machine 210, in some embodiments:

$$R_i = \frac{\frac{1}{C_i} * \sum_{j=1}^{K} M_j}{M_i * \sum_{j=1}^{K} \frac{1}{C_j}}$$

The virtual machine ranks may be used in various ways. In some embodiments, the ranking system 200 may include a user interface 250 for outputting one or more of the ranks to a user, such as a system administrator. Generally, the ranks may provide an indication as to which virtual machines 210 currently provide the best value, or the best return on investment. A higher rank may generally suggest a better value than a comparatively lower rank.

As an illustration, the below table provides the ranks of three virtual machines 210, one of which is small, one of which is medium, and one of which is large. In the table, C represents computational capacity, M represents cost in cents per hour, and R represents the relative rank, calculated according to the exemplary formula provided above. It will be understood that the computational capacities and costs per hour in this example are illustrative only, provided to show the results of exemplary rank calculations.

| Virtual Machine | C | M | Rank |
| --- | --- | --- | --- |
| Small | 300 | 3 | 1.72 |
| Medium | 230 | 6 | 1.12 |
| Large | 170 | 12 | 0.76 |

As shown above, even though the large virtual machine 210 may have a lower computational capacity and may thus be more likely to output completed work quickly, a small virtual machine 210 may be ranked higher than that large virtual machine due to a lower cost.

Some embodiments of the ranking systems 200 and methods may be used to rank virtual machines 210 in a single cloud environment managed by a single load balancer 220, or across multiple cloud environments where each cloud has its own load balancer 220. Further, some exemplary embodiments may be used to compare clouds of virtual machines 210 to one another, where each cloud may include one or more virtual machines 210.

Figure 4:
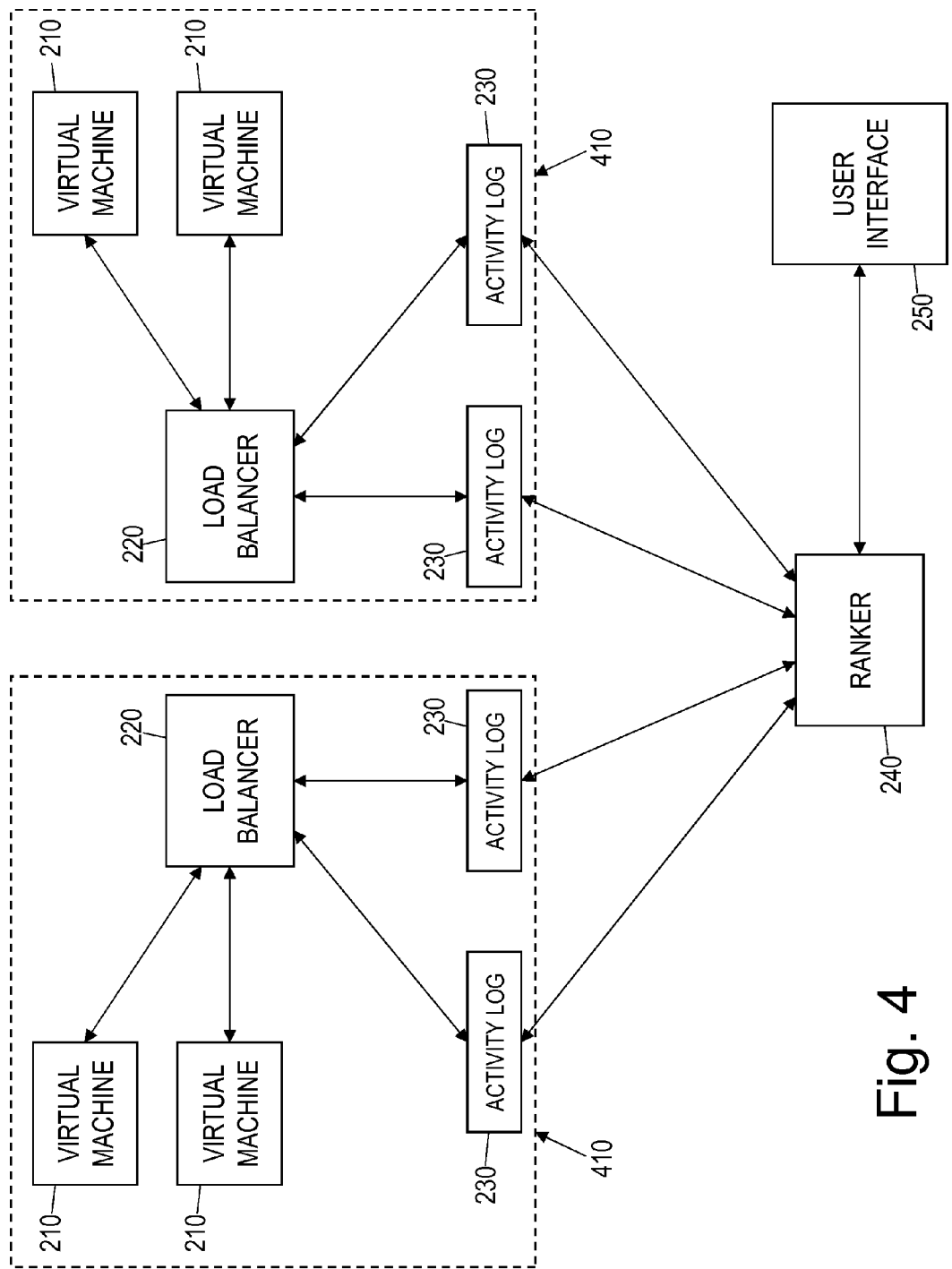
FIG. 4 is a block diagram of the ranking system configured to compare multiple clouds, each cloud having multiple virtual machines, according to some embodiments of this disclosure.

FIG. 4 is a block diagram of a ranking system 200 for comparing computing clouds 410, each having multiple virtual machines 210, according to some embodiments of this disclosure. As shown, each cloud 410 may include a load balancer 220 for distributing work among virtual machines 210 within that cloud. Additionally, as discussed above, each load balancer 220 may maintain activity logs 230 for the virtual machines 210 to which is distributes work. In this case, however, the ranker 240 may analyze data from activity logs 230 that span the two or more clouds 410 of virtual machines 210.

As discussed above, the ranker 240 may update variables related to the virtual machines 210 corresponding to the activity logs 230. The ranker 240 may also calculate ranks, give the formula provided above or other suitable formula, where the set of virtual machines 210 considered in calculating a rank for a first virtual machine 210 may include virtual machines 210 across multiple clouds. Thus, the rank may be relative to other virtual machines 210 inside the same computing cloud 410, in one or more different computing clouds 410, or a combination thereof.

In some embodiments, the ranker 240 may be configured to rank each computing cloud 410 relative to the one or more other computing clouds 410. For example, the rank $R_1$ of a first cloud 410 from among two computing clouds 410 may be calculated as follows, where $P_1$ represents the sum of the inverse of the computational capacities of the virtual machines 210 in the first cloud 410; $P_2$ represents the sum of the inverse of the computational capacities of the virtual machines 210 in a second cloud 410; $M_1$ represents the sum of the costs of the virtual machines 210 in the first cloud 410; and $M_2$ represents the sum of the costs of the virtual machines 210 in the second cloud 410:

$$R_1 = \frac{P_1 * (M_1 + M_2)}{(P_1 + P_2) * M_1}$$

Analogously, the rank for the second computing cloud 410 may be calculated as follows:

$$R_2 = \frac{P_2 * (M_1 + M_2)}{(P_1 + P_2) * M_2}$$

Generally, a cloud 410 with a higher rank as compared to another cloud 410 may be deemed more valuable, as providing a greater return on investment. Accordingly, the ranking system 200 may rank clouds 410 of virtual machines 210, so as to provide a comparison of the values of those clouds 410.

The ranks of virtual machines 210 and the ranks of clouds 410 may be used in various ways by the ranking system 200 itself or by an administrator. For example, in some embodiments where individual virtual machines 210 are ranked, the load balancer 220 may consider the various ranks of the virtual machines 210 when assigning that work. For instance, those ranks may be used as, or may contribute to, weights used in determining work assignments. When work is to be assigned, the load balancer 220 may select the virtual machine 210 with the highest current rank to receive the work. If it appears that one or more individual virtual machines 210 are not receiving a sufficient amount of work, or have consistently low ranks, this may indicate that monetary investment in those virtual machines 210 is not worthwhile as compared to the other virtual machines. Analogously, if clouds 410 are being ranked and it appears that one or more clouds 410 have consistently low ranks compared to one or more other clouds 410, this may indicate that monetary investment in the low-ranked clouds 410 is not worthwhile. An administrator may therefore cease altogether using virtual machines 210 or computing clouds 410 with low ranks.

Accordingly, various embodiments of the ranking systems 200 and methods may determine the values of virtual machines 210 or computing clouds 410 relative to one another, which values may be used, for example, to affect load balancing or to determine which virtual machines 210 or computing clouds 410 should continue being used.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Further, as will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   accessing, by one or more computer processors, a set of two or more activity logs associated with two or more virtual machines, each activity log being associated with a corresponding virtual machine and indicating when work assignments are received and completed by the associated virtual machine;
   calculating, by the one or more computer processors, a computational capacity of each of the two or more virtual machines based at least in part on the activity logs, wherein the computational capacity of a first virtual machine is configured to increase responsive to an increase in the time between completion of work assignments by the first virtual machine;
   determining, by the one or more computer processors, a monetary investment of running each of the two or more virtual machines;
   calculating, by the one or more computer processors, a rank for each of the two or more virtual machines;
   wherein calculating the rank for each of the two or more virtual machines comprises calculating a first rank of the first virtual machine and a second rank of a second virtual machine of the two or more virtual machines;
   wherein the first rank of the first virtual machine is negatively correlated with the computational capacity of the first virtual machine, such that an increase in computational capacity decreases a virtual machine's rank, while a decrease in computational capacity increases the rank; and
   wherein the first rank is negatively correlated with the monetary investment of running the first virtual machine, such that an increase in monetary investment of a virtual machine decreases the rank, while a decrease in monetary investment increases the rank; and
   distributing a plurality of work assignments to the two or more virtual machines based at least in part on the respective ranks of the two or more virtual machines.

2. The method of claim 1, further comprising dynamically updating the ranks of the two or more virtual machines as work assignments are completed by the two or more virtual machines.

3. The method of claim 1, wherein calculating the first rank of the first virtual machine is further based, at least in part, on the monetary investments of running one or more other virtual machines and on the calculated computational capacities of the one or more other virtual machines.

4. The method of claim 1, further comprising:
   updating the calculated computational capacity of the first virtual machine when a work assignment is completed by the first virtual machine; and
   recalculating the first rank after the computational capacity of the first virtual machine is updated.

5. The method of claim 1, further comprising:
   wherein the two or more virtual machines comprise a first cloud of virtual machines receiving work from a first load balancer and a second cloud of virtual machines receiving work from a second load balancer; and
   calculating a third rank for the first cloud and a fourth rank for the second cloud, wherein the third rank and the fourth rank are each based, at least in part, on the calculated computational capacities of the virtual machines in the first cloud and the second cloud and on the monetary investments of the virtual machines in the first cloud and the second cloud.

6. A system comprising:
a computer processor;
a first load balancer configured to maintain a first cloud of two or more activity logs associated with two or more virtual machines, each activity log being associated with a corresponding virtual machine and indicating when work assignments are received and completed by the associated virtual machine; and
a ranker configured to:
calculate a computational capacity of each of the two or more virtual machines in the first cloud based at least in part on the activity logs, wherein the computational capacity of a first virtual machine in the first cloud is configured to increase responsive to an increase in the time between completion of work assignments by the first virtual machine;
determine a monetary investment of running each of the two or more virtual machines in the first cloud;
calculate, by the computer processor, a rank for each of the two or more virtual machines in the first cloud;
wherein calculating the rank for each of the two or more virtual machines comprises calculating a first rank of the first virtual machine and a second rank of a second virtual machine of the two or more virtual machines;
wherein the first rank of the first virtual machine is negatively correlated with the computational capacity of the first virtual machine, such that an increase in computational capacity decreases a virtual machine's rank, while a decrease in computational capacity increases the rank; and
wherein the first rank is negatively correlated with the monetary investment of running the first virtual machine, such that an increase in monetary investment of a virtual machine decreases the rank, while a decrease in monetary investment increases the rank; and
distribute a plurality of work assignments to the two or more virtual machines based at least in part on the respective ranks of the two or more virtual machines.

7. The system of claim 6, the ranker being further configured to dynamically update the ranks of the two or more virtual machines as work assignments are completed by the two or more virtual machines.

8. The system of claim 6, the ranker being configured to calculate the first rank of the first virtual machine further based, at least in part, on the monetary investments of running one or more other virtual machines and on the calculated computational capacities of the one or more other virtual machines.

9. The system of claim 6, the ranker being further configured to update the calculated computational capacity of the first virtual machine when a work assignment is completed by the first virtual machine, and to recalculate the first rank after the computational capacity of the first virtual machine is updated.

10. The system of claim 6, further comprising:
a second load balancer configured to distribute work assignments to a second cloud of virtual machines, and to maintain a second set of activity logs associated with the second cloud of virtual machines, each activity log being associated with a corresponding virtual machine in the second cloud;
wherein the ranker is further configured to:
calculate a computational capacity of each of the virtual machines in the second cloud; and
calculate a third rank for the first cloud and a fourth rank for the second cloud, wherein the third rank and the fourth rank are each based, at least in part, on the calculated computational capacities of the virtual machines in the first cloud and the second cloud and on the monetary investments of running the virtual machines in the first cloud and the second cloud.

11. A computer program product comprising a non-transitory computer readable storage medium having computer readable program code embodied thereon, the computer readable program code executable by a processor to perform a method comprising:
accessing a set of two or more activity logs associated with two or more virtual machines, each activity log being associated with a corresponding virtual machine and indicating when work assignments are received and completed by the associated virtual machine;
calculating a computational capacity of each of the two or more virtual machines based at least in part on the activity logs, wherein the computational capacity of a first virtual machine is configured to increase responsive to an increase in the time between completion of work assignments by the first virtual machine;
determining a monetary investment of running each of the two or more virtual machines;
calculating a rank for each of the two or more virtual machines;
wherein calculating the rank for each of the two or more virtual machines comprises calculating a first rank of the first virtual machine and a second rank of a second virtual machine of the two or more virtual machines;
wherein the first rank of the first virtual machine is negatively correlated with the computational capacity of the first virtual machine, such that an increase in computational capacity decreases a virtual machine's rank, while a decrease in computational capacity increases the rank; and
wherein the first rank is negatively correlated with the monetary investment of running the first virtual machine, such that an increase in monetary investment of a virtual machine decreases the rank, while a decrease in monetary investment increases the rank; and
distributing a plurality of work assignments to the two or more virtual machines based at least in part on the respective ranks of the two or more virtual machines.

12. The computer program product of claim 11, the method further comprising dynamically updating the ranks of the two or more virtual machines as work assignments are completed by the two or more virtual machines.

13. The computer program product of claim 11, wherein calculating the first rank of the first virtual machine is further based, at least in part, on the monetary investments of running one or more other virtual machines and on the calculated computational capacities of the one or more other virtual machines.

14. The computer program product of claim 11, the method further comprising:
updating the calculated computational capacity of the first virtual machine when a work assignment is completed by the first virtual machine; and
recalculating the first rank after the computational capacity of the first virtual machine is updated.

15. The computer program product of claim 11, the method further comprising:
wherein the two or more virtual machines comprise a first cloud of virtual machines receiving work from a first load balancer and a second cloud of virtual machines receiving work from a second load balancer; and
calculating a third rank for the first cloud and a fourth rank for the second cloud, wherein the third rank and the fourth rank are each based, at least in part, on the calculated computational capacities of the virtual machines in the first cloud and the second cloud and on the monetary investments of the virtual machines in the first cloud and the second cloud.

* * * * *